(12) United States Patent
Higgins

(10) Patent No.: US 7,716,768 B2
(45) Date of Patent: May 18, 2010

(54) FISHERMAN'S PLIERS

(76) Inventor: Dennis A. Higgins, 34030 199th St., Easton, KS (US) 66020

( * ) Notice: Subject to any disclaimer, the term of this patent is extended or adjusted under 35 U.S.C. 154(b) by 0 days.

(21) Appl. No.: 11/787,075

(22) Filed: Apr. 13, 2007

(65) Prior Publication Data
US 2008/0250569 A1 Oct. 16, 2008

(51) Int. Cl.
B25F 1/00 (2006.01)
B25B 7/02 (2006.01)
B25B 7/22 (2006.01)

(52) U.S. Cl. .................... 7/106; 81/418; 81/426
(58) Field of Classification Search ........... 7/105, 7/125; 81/418, 419, 426, 490
See application file for complete search history.

(56) References Cited

U.S. PATENT DOCUMENTS

| | | | | |
|---|---|---|---|---|
| 2,220,317 A | * | 11/1940 | Cynoske | 29/248 |
| 4,208,749 A | | 6/1980 | Hermann et al. | |
| 4,881,434 A | * | 11/1989 | Keller | 81/426 |
| 4,899,482 A | * | 2/1990 | Gerdes | 43/4 |
| 5,283,920 A | * | 2/1994 | Plummer | 7/106 |
| 5,839,141 A | | 11/1998 | Hermann | |
| 5,850,649 A | | 12/1998 | Simpson | |
| 6,026,607 A | * | 2/2000 | Bukowski | 43/4 |
| 6,061,858 A | * | 5/2000 | Shepard | 7/106 |
| 2005/0278865 A1 | * | 12/2005 | West | 7/106 |

* cited by examiner

*Primary Examiner*—David B Thomas

(57) ABSTRACT

Pliers for removing paint from a jig-eye hole, including a first plier having a first handle and first jaw. The first jaw includes a tooth extending from the end. A second plier is connected to the first plier and has a second handle and a second jaw including an invagination at the end. When the jig-eye hole is registered with the invagination, and the first handle and second handle are rotated closer together, the tooth is inserted into the jig-eye hole for paint removal. Preferably, the first handle section has a hollow handle and a retractable threader in the handle. The pliers may include a tool module. The tool module forms structure for removable connection with the invagination on the handle end. The tool module includes a retractable tool, such as a fishing line threader or hone so that the tool may be extended and used by the fisherman.

12 Claims, 12 Drawing Sheets

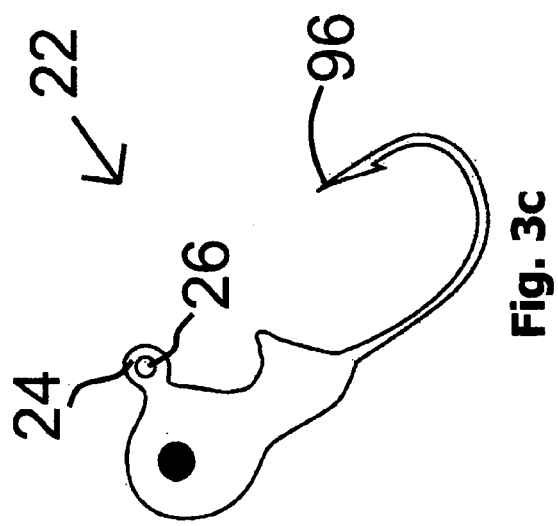
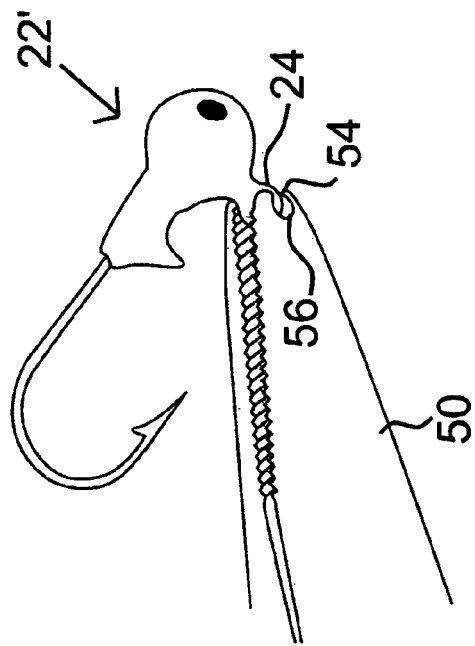
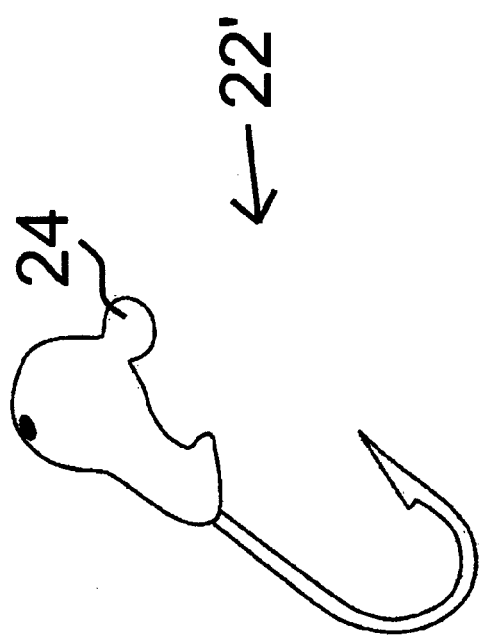

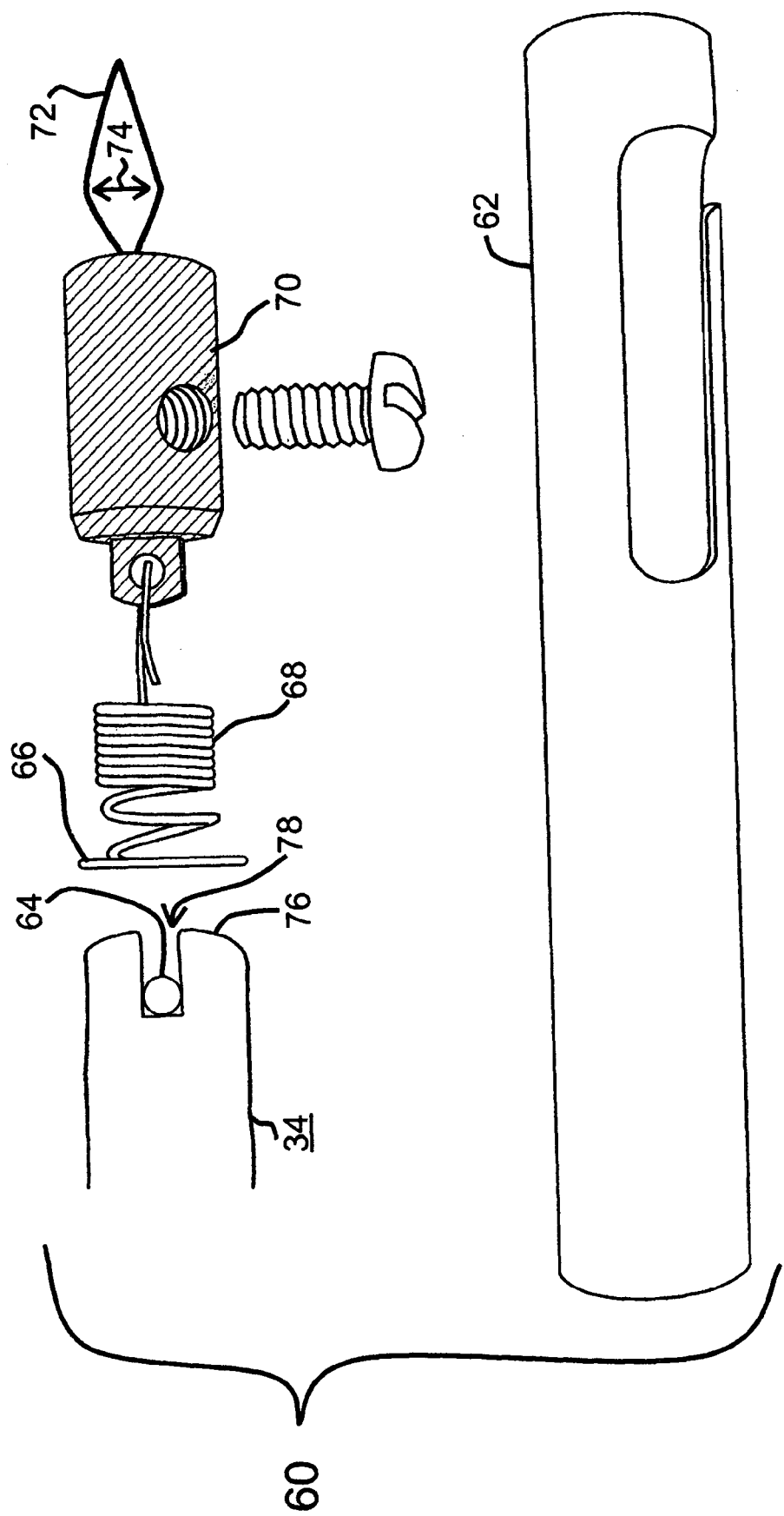

FISHERMAN'S PLIERS

BACKGROUND OF THE INVENTION

1. Field of the Invention

The present invention relates to improved pliers for a fisherman. More particularly, it is directed to pliers for removing paint from a jig-eye line attachment hole as well as providing modular tools encased on the handles.

2. Description of Related Art

Fishermen often use a lead-headed jig for fishing. The jig typically includes an eye with a hole for threading fishing line to attach the jig. The jig-eye presents two common problems: first, the hole in the jig-eye is usually filled with paint remaining from the process of painting the jig and second, once the paint is removed, the hole is small and therefore difficult to thread with the fishing line.

The first problem (i.e. removing the paint from the jig-eye hole) has been addressed several times. One representative patent is U.S. Pat. No. 5,850,649 (Simpson). As seen at FIG. 2 and described at column 4, lines 25-47, the jig-eye 22 is aligned in jig-eye recess 20 and then pin 32 is brought downward (by squeezing the plier handles together) so that pin 32 penetrates the jig-eye hole, thus removing any paint therein.

The problem with this technique is that it is inconvenient because the jig-eye must be precisely aligned with recess 20 and at an orthogonal angle to the pliers. In other words, good vision and a great deal of manual dexterity is required for the alignment.

Furthermore, once the paint has been removed, the pliers of U.S. Pat. No. 5,850,649 provide no convenient method for threading the jig-eye with a fishing line, so even greater manual dexterity and eyesight is required at that stage. Experienced fishermen will appreciate that tasks requiring manual dexterity and vision become more problematic when sitting or standing in a boat. Other problems include impaired eyesight, boat movement, impaired dexterity, ambient lighting and wind.

Thus there is a need for a fisherman's pliers which allow for easy removal of paint from a jig-eye hole and also convenient threading of the hole once the paint has been removed. In addition, pliers which include replaceable, modular tools (such as a threader or hook hone) would also provide additional convenience.

SUMMARY OF THE INVENTION

The present invention solves the problems of the prior art by providing an improved fisherman's pliers which allow for convenient removal of paint from a jig-eye hole. The pliers include a first plier member having a first handle section and a first jaw section. The first jaw section has a first end including a tooth extending downwardly the first end. A second plier member is connected to the first plier member between the first handle section and the first jaw section for rotational motion. The second plier also has a second handle section and a second jaw section. The second jaw section is disposed below the first jaw section and has a second end including portions forming an invagination for mating reception of the tooth. When the jig-eye hole is registered with the invagination of the second end, and the first handle section and second handle section are manually rotated closer together, the tooth is inserted into the jig-eye hole for removal of the paint.

In preferred embodiments, the first handle section has a hollow handle end and includes a retractable fishing line threader contained in the hollow handle. In particularly preferred embodiments, the pliers include a tool module including a housing partially enveloping and extending from the handle end of either handle. Portions of the tool module form structure for mating, removable connection with the invagination on the handle end. The tool module includes a retractable fishing tool, such as a fishing line threader or hook hone so that the tool may be extended and used by the fisherman and then retracted when not in use.

BRIEF DESCRIPTION OF THE FIGURES

FIG. 3a is perspective view of an unmodified fishing jig;

FIG. 3b is a partial view showing the pliers in position to be used on the unmodified jig in accordance with the present invention;

FIG. 3c is an elevation view of the modified jig in accordance with the present invention;

FIG. 9 shows the threader module in an exploded side view;

DETAILED DESCRIPTION

Figure 2:
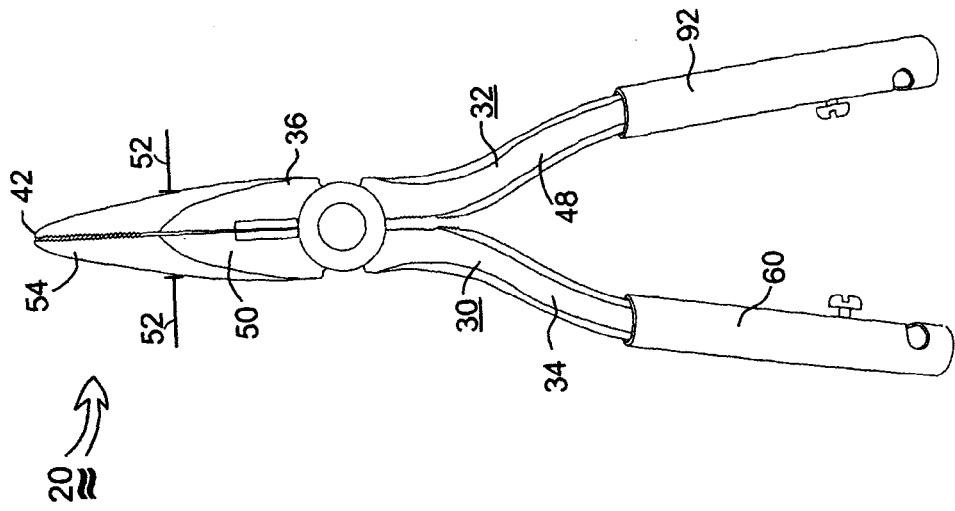
FIG. 2 is a side elevational view of a fisherman's pliers in a closed position.
Figure 1:
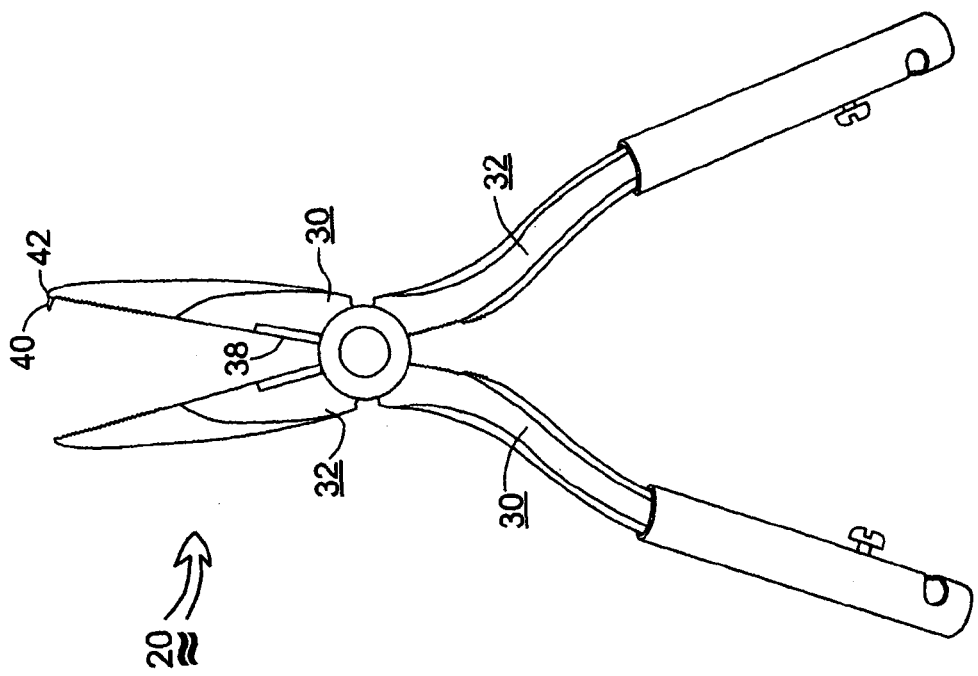
FIG. 1 is a side elevational view of a fisherman's pliers in an open position.

Turning now to the drawings in general and FIGS. 1 and 2 in particular, a fisherman's pliers 20 is shown respectively in open and closed positions. Pliers 20 are used for threading a jig 22 and jig-eye 24 with fishing line 28 (see FIG. 8h).

Referring to FIG. 1 pliers 20 include a first plier member 30 and a second plier member 32. First plier member 30 and second plier member 32 are joined conventionally to allow rotational movement.

Referring to FIG. 1, first plier member 30 has a first handle section 34 and a first jaw section 36. First section 36 includes a wire cutter element 38. First jaw member 36 has a tooth 40 at a tip 42 thereof.

Figure 4:
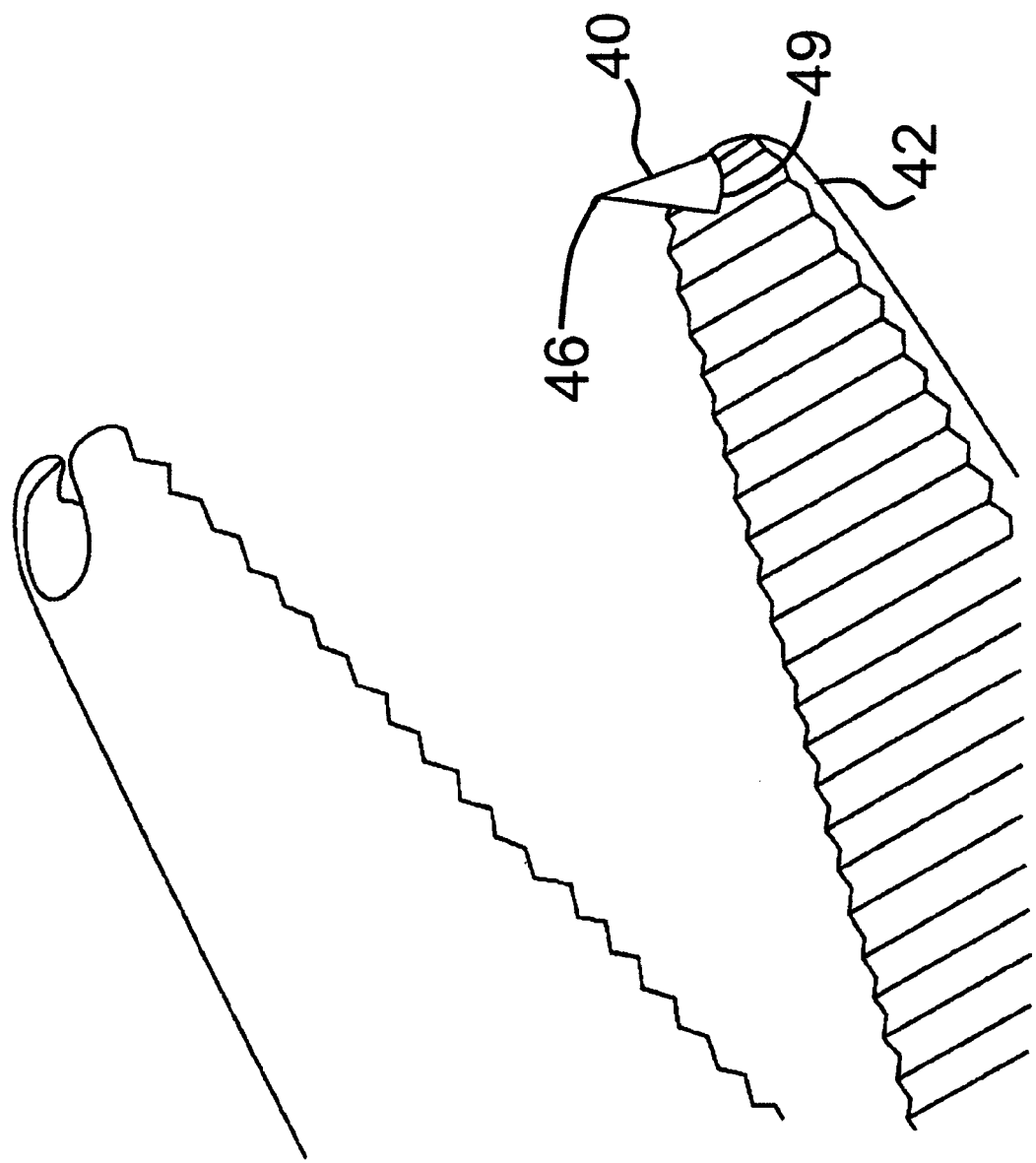
FIG. 4 is a partial perspective view of the jaw end of the pliers.

Referring to FIG. 4, tooth 40 is conical in shape. Tooth 40 includes a base 44, an apex 46 and is conical in shape in the preferred embodiment. Base 44 presents a diameter of about 1/16 inches in the preferred embodiment. Tooth 40 presents a length of about 3/32 inch.

Referring to FIG. 2, second plier member 32 has a second handle section 48 and a second jaw section 50. First jaw section 36 and section jaw section 50 combine to present a profile at the approximate midpoint of ½" as indicated at reference numeral 52.

Figure 10:
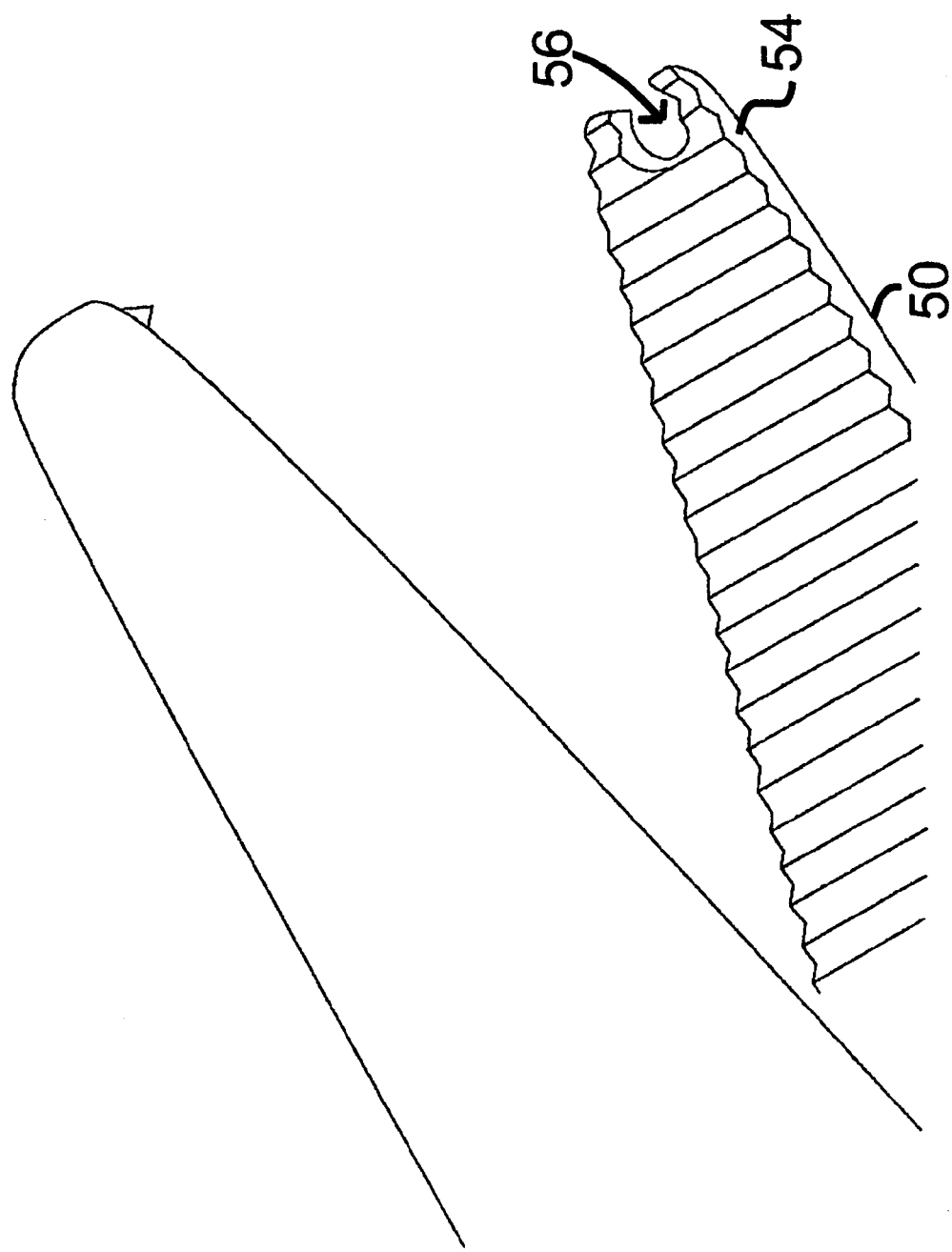
FIG. 10 is another partial view of the end of the pliers.
Figure 11:
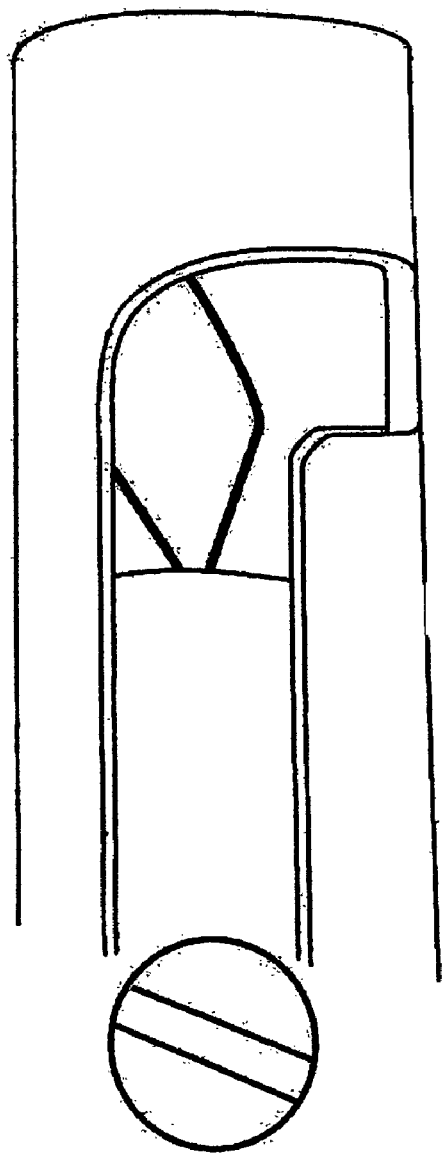
FIG. 11 is a side partial view of the threader module.
Figure 12:
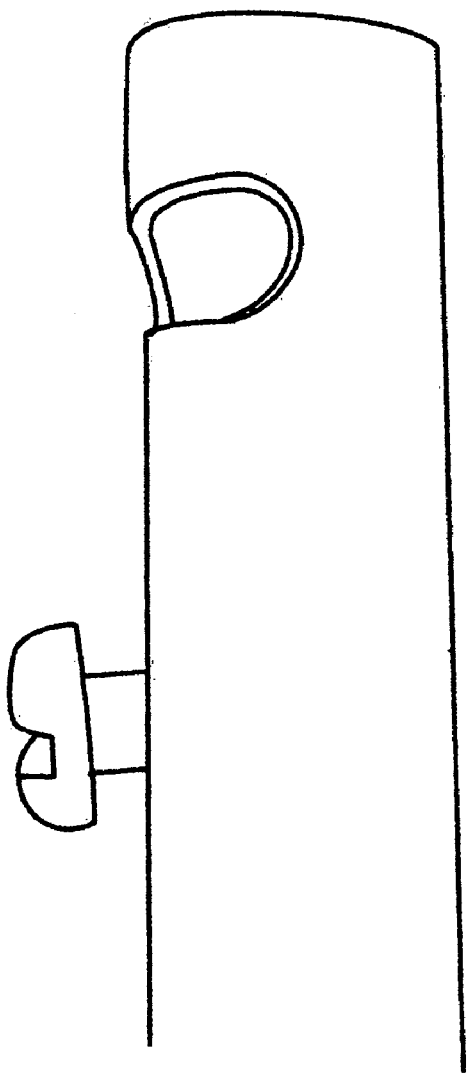
FIG. 12 is a side partial view of the threader module.

Referring to FIG. 10, second jaw section 50 includes a tip 54 and portions forming an invagination 56. Invagination 56 includes a maximum diameter as indicated at reference numeral 58. Maximum width 58 is substantially equal to the diameter of base 44 of tooth 40.

Referring again FIG. 2, first handle section 34 includes a first tool module 60 (shown in an exploded view in FIG. 9).

Referring to FIG. 9, first tool module 60 includes casing 62, a pin 64, a platform 66, a spring 68, a base 70 and a tool element or threader element 72. Threader element 72 has a maximum width of 74 of about ½ inch as indicated. Threader element 72 is planar and diamond shaped. First handle section 34 includes an end 76 with a notch 78 formed thereat, for attachment of tool module 60.

Threader module 60 is attached to end 76 of first handle section 34 by insertion of pin 64 into notch 78. Spring 68 allows base 70 and threader element 72 to extend from platform 66 (see FIG. 5 for extended mode). Housing 62 is hollow and will encase end point 76 of first handle section 34 when pin 64 is inserted into notch 78.

Figure 5:
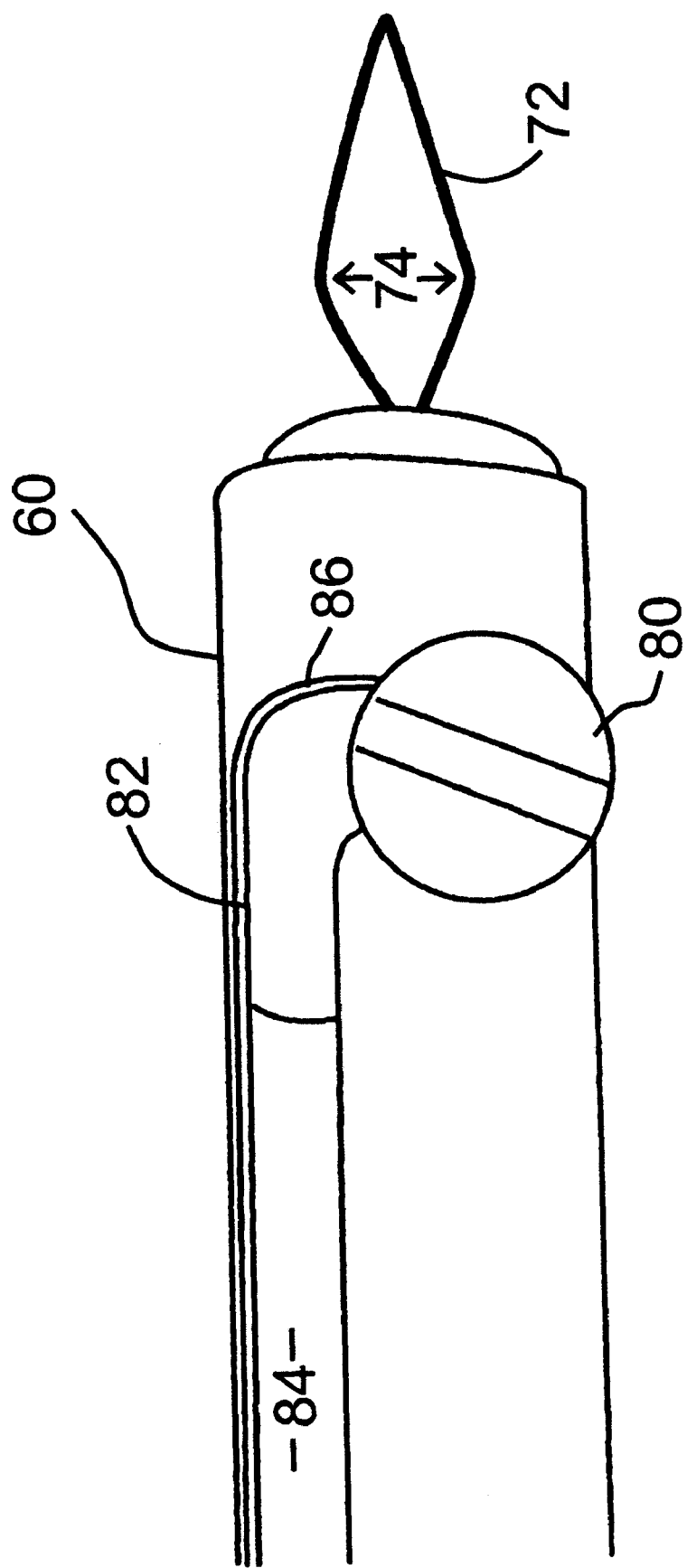
FIG. 5 is a partial elevational view of a module mounted at the handle end of the pliers.
Figure 6:
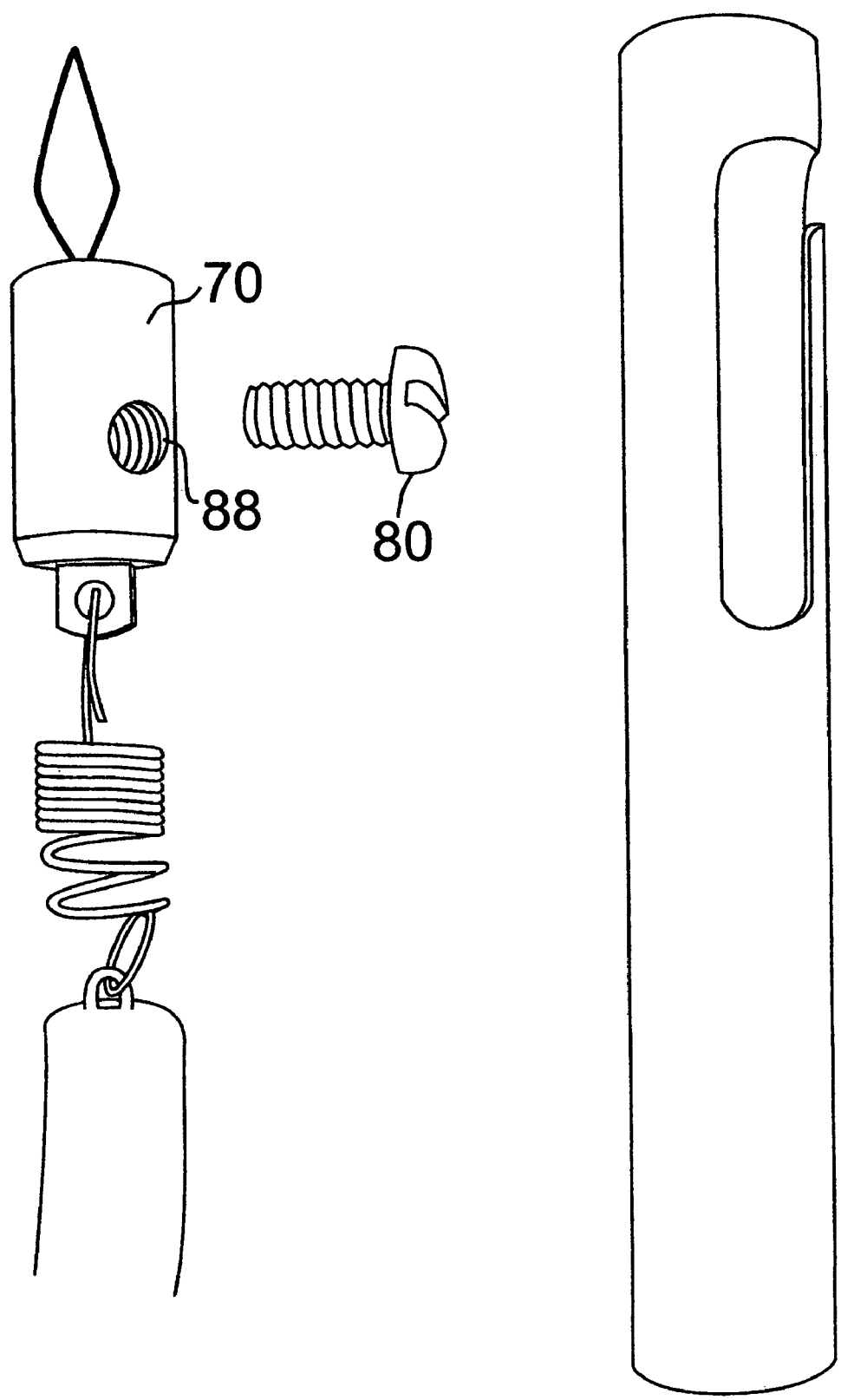
FIG. 6 is an exploded view of the module of FIG. 5.
Figure 7:
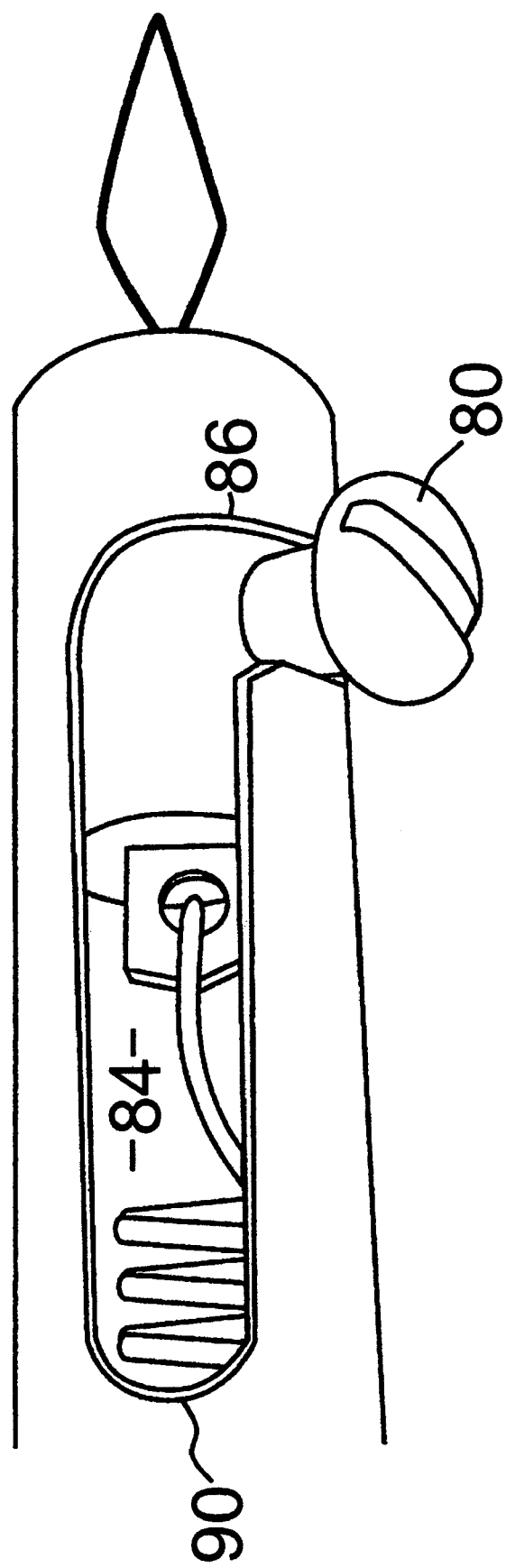
FIG. 7 is a partial elevational view of a module mounted at the handle end of the pliers.

Referring to FIG. 5, threader module 72 includes a screw 80 which is aligned in a groove 82 of housing 60. Groove 82 includes an elongated channel 84 and a topmost portion 86. Groove 82 is removably received within base 70 at threaded screw hole 88. Threader module 72 is moved between its extended position or mode as shown at FIG. 5 and its retracted position as shown at FIG. 2, by moving screw 80 from the position shown in FIG. 5 where it is proximal to upper end 86 to the lower most portion 90 of channel 84 (see FIG. 7).

Figure 13:
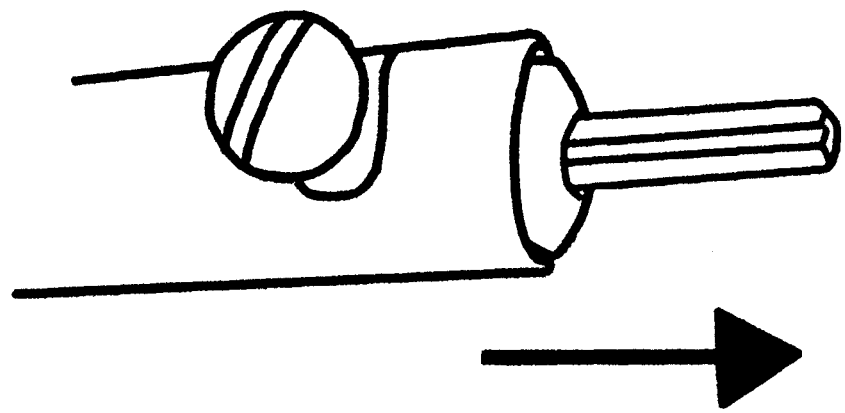
FIG. 13 is a partial side view of a hone module in extended mode.

Second handle section 48 includes a second tool module or hone module 92 as shown at FIG. 2. Hone module 92 is similar to threader module 72 in every respect except there is a hook hone element 94 as seen at FIG. 13, rather than the threader element 72 of first tool module 60.

The use of pliers 20 will now be discussed. Initially, a jig 22' as shown at FIG. 3a is purchased from a store. The problem with such a jig 22' as it is purchased off the shelf is that jig-eye 24' is filled with paint as indicated.

Referring to FIG. 3, jig 22' is altered by the process illustrated in FIG. 3b. In other words, jig-eye 24' is aligned with tip 42 of tooth 40 (not shown in FIG. 3b). In particular, jig-eye 24' of jig 22' is aligned with invagination 56 on end 54 of second jaw section 50 and then first plier member 30 and second plier member 32 are put in the closed position as seen at FIG. 2 which in turn drives tooth 40 through accumulated paint in jig-eye 24', thus punching the undesirable paint out. Alternatively, jig-eye 24' may be aligned with apex 46 of tooth 40 first, depending on the preference of the user. By either technique, the modified jig 22 is obtained, i.e. the jig-eye 24 has a clear hole 26, observable in FIG. 3c.

Figure 8A:
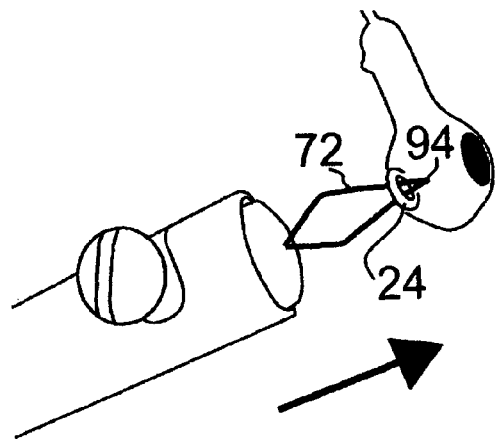
FIG. 8a shows a threader module in the extended position aligned with the modified jig.
Figure 8B:
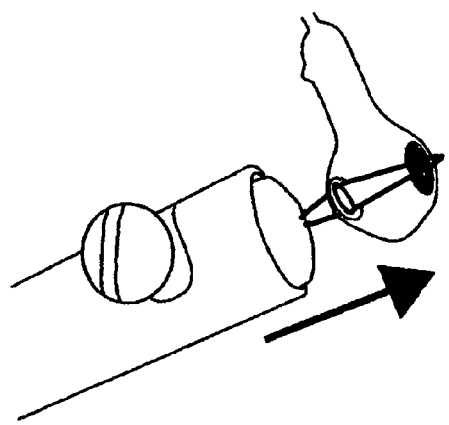
FIG. 8b same view as FIG. 8a but the threader element of the module has been further inserted into the jig eye.
Figure 8C:
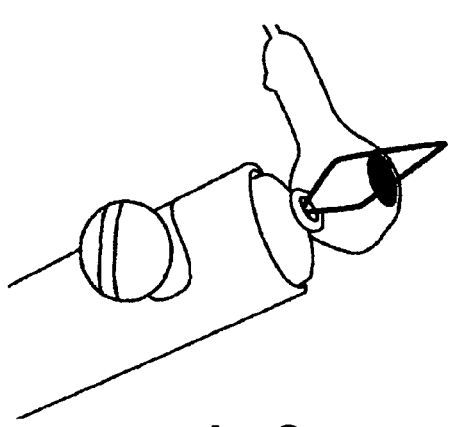
FIG. 8c is similar to that of FIG. 8a except the threader element has been fully extended into jig eye.

Jig-eye hole 26 of FIG. 3c is now ready for threading. Referring to FIG. 8a, apex 94 of threader element 72 is placed through jig-eye 24. Then threader element 72 is further pushed through jig-eye 24 as shown at FIG. 8b. Threader 72 is seen to be compressed at that point. Finally, the threader element 72 is pushed all the way through jig-eye 24 and secured by jig-eye 24, so that jig 22 is also secured, as shown at FIG. 8c. Note that threader module 60 is in the extended position in FIGS. 8a through 8g.

Figure 8D:
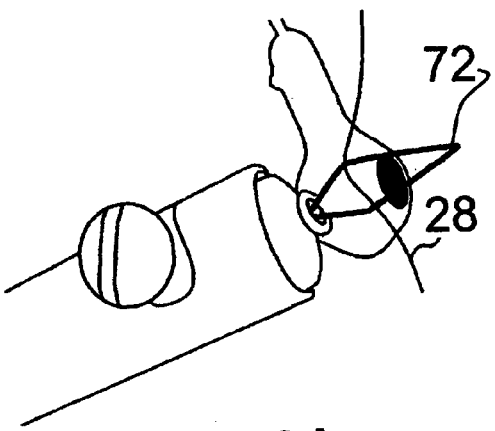
FIG. 8d is a similar depiction of FIG. 8c but further showing threading of a fishing line through the threader element in accordance with the present invention.

Next, referring to FIG. 8d, a fishing line 28 is threaded through threader element 72. This process is made easier by the maximum width area 74 (see FIG. 5), providing a much wider target for threading.

Figure 8E:
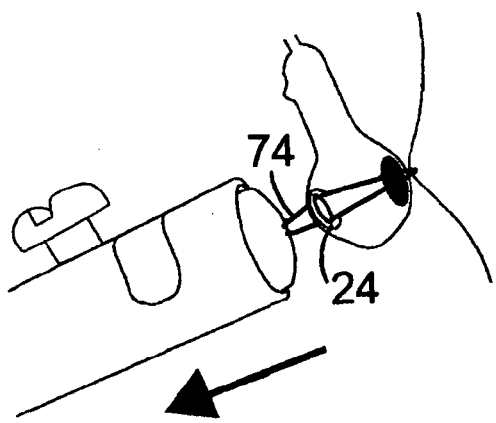
FIG. 8e is a partial perspective view continuing from FIG. 8d but showing the threader element in partial retraction.

Referring to FIG. 8e, screw 80 is re-positioned off of the uppermost position 86 and put in a semi-retracted position as shown. In this fashion the threader element 72 is partially retracted through jig-eye 24, as shown.

Figure 8F:
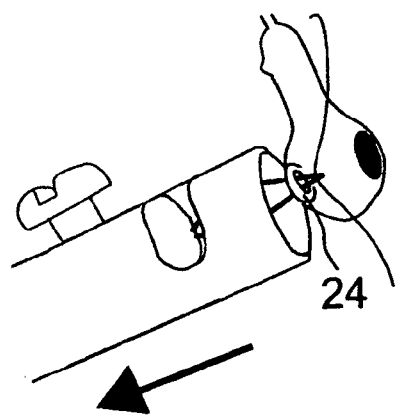
FIG. 8f is a view similar to FIG. 8e except the threader element is in further state of retraction.

Referring to FIG. 8f, screw 80 is further re-positioned in channel 84 closer to lower most portion 90 of channel 84 (see FIG. 7) so that threader element 72 is shown as almost completely removed from jig-eye 24 (i.e. first module 60 is almost completely in retracted mode).

Figure 8G:
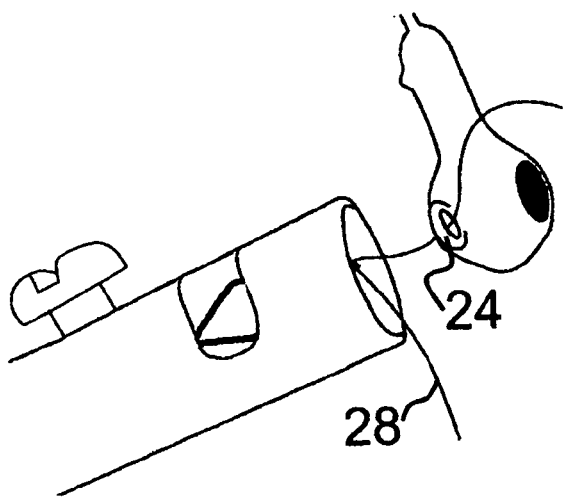
FIG. 8g shows the threader element fully retracted in the threading process.
Figure 8H:
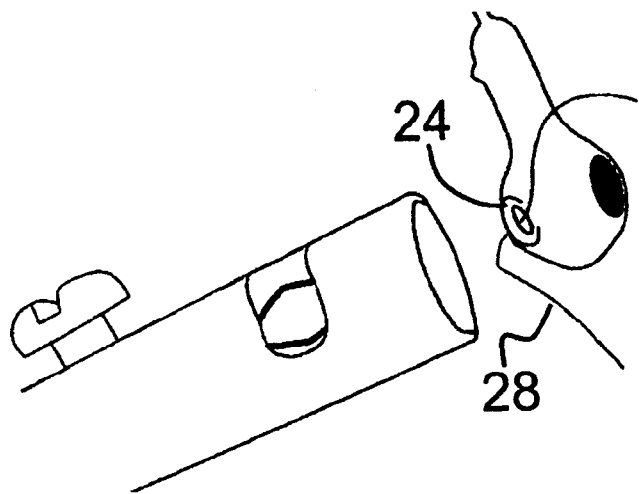
FIG. 8h shows the threaded jig detached from the threader element.

Finally, as shown at FIG. 8g, threader element 72 is completely retracted, thus pulling fishing line 28 through jig-eye 24. Then, as shown at FIG. 8h, fishing line 28 is removed from threader element 72 so that fishing line 28 is loose. Then fishing line 28 is tied off on jig-eye 24 with whatever knot is desirable so that fishing can begin.

Hone module 92 is extended from second handle end 48 in an analogous fashion to threader module 60. In this fashion, hone 92 can be used to sharpen hook 96 of jig 22 (see FIG. 3c). Either module 60 or 92 may be detached at anytime by simple mechanical pressure by pulling outward so that pin 64 is detached from notch 78. In this fashion a new module may replace the old one. For example if a different tool element is desired for use rather than a threader element 72 or hone 94 then a new module can be introduced or, if a module is damaged or broken it may also be replaced.

Figure 14A:
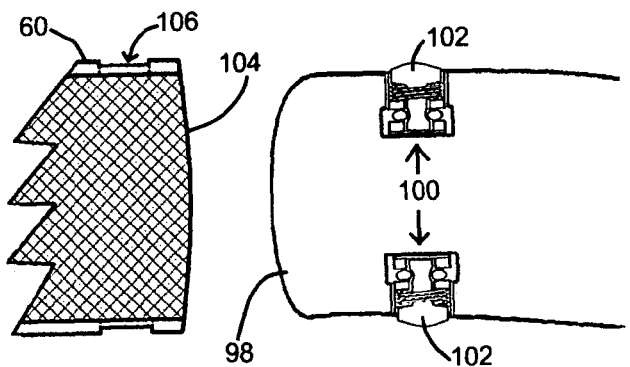
FIG. 14a is a partial view of the end of one plier element and a corresponding end of a threader module.
Figure 14B:
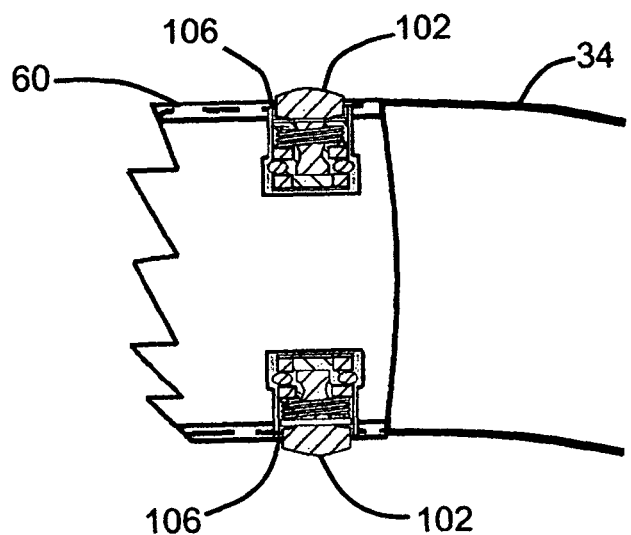
FIG. 14b is a partial view as in FIG. 14a but with the plier element and threader module engaged.

Any other method for convenient, removable connection between first handle section 34 and module 60, may also be used. For example, a ball detent system, such as shown at FIGS. 14a and 14b. Referring to FIG. 14a, the end of first plier element 34 includes an end 98 and spring detent assembly 100, including a rounded top 102. Threader module 60 includes a handle end 104 and two detent apertures 106. FIG. 14b shows module 60 engaged with second plier element 34 at detents 106.

In this fashion, someone using the inventive fisherman's pliers 20 has an easy method of removing unwanted paint from a jig-eye 24', as well as a convenient way of threading fish line 28 through jig-eye 24. Because the tools at the end of the handles are modular they may be replaced when broken or substituted for different tool functions which gives added convenience as does the retractability function.

It should be apparent that the invention not only accomplishes the major functions required from such systems but does so in a particularly advantageous manner. It should be equally apparent, however, that various minor and equivalent modifications from the embodiments disclosed herein for illustrative purposes could be employed without departing from the essence of the invention. It is to be understood, therefore, that the invention should be regarded as encompassing not only the subject matter literally defined by the claims which follow, but also technical equivalents thereof.

What is claimed is:

1. A fisherman's pliers adapted for manual use by a human user removing paint from a jig-eye hole, the pliers including:
   a first plier member having a first handle section and a first jaw section, the first jaw section having a first end including a tooth extending downwardly therefrom;

and a second plier member connected to the first plier member between the first handle section and the first jaw section for rotational motion thereabout, the second plier having a second handle section and a second jaw section, the second jaw section disposed below the first jaw section and having a second end including portions forming an invagination on the second end for mating reception of the tooth, wherein when the jig-eye hole is registered with the invagination of the second end, and the first handle section and second handle section are manually rotated closer together, the tooth is inserted into the jig-eye hole for removal of the paint.

2. The pliers of claim 1, wherein the tooth is conical in shape.

3. The pliers of claim 1, wherein the tooth presents a maximum diameter of 1/16 inch.

4. The pliers of claim 1, wherein the second handle includes portions forming a hollow channel with a retractable threader received therein.

5. The pliers of claim 1, wherein the first handle includes portions forming a hollow channel with a retractable hone received therein.

6. The pliers of claim 1, wherein the first jaw and the second jaw present a width and a combined profile, the width having a maximum dimension of 3/8 inch and the combined profile having a maximum dimension of 1/2 inch.

7. A fisherman's pliers adapted for manual threading of a fishing line through a small aperture, the pliers comprising:
   a first plier member having a first handle section and a first jaw section, the first handle section having a hollow handle end including a retractable threader contained therein, the retractable threader affixed to the hollow hand end,
   the threader including retraction means, a base, a compressible, planar threader element presenting a maximum width;
   and a second plier member connected to the first plier member between the first handle section and the first jaw section for rotational motion thereabout, the second plier having a second handle section and a second jaw section,
   wherein when the threader element is extended substantially beyond the hollow handle end and the threader element is substantially placed through the small aperture, the threader element still presenting the maximum width, and when the thread is placed through the threader element and then the threader is retracted to its original position, the thread is pulled through the small aperture.

8. The pliers of claim 7 wherein the threader element is substantially planar and presents a diamond-shaped configuration within the plane.

9. The pliers of claim 7, wherein the first handle section includes portions forming a notch, and the retractable threader and portions of the first handle form a tool module including a housing partially enveloping and extending from the handle end of the first handle, portions of the tool module forming structure for mating, removable connection with the notch on the handle end.

10. A fisherman's pliers comprising:
    a first plier member having a first handle section and a first jaw section, the first handle section having a handle end including portions forming a notch;
    a second plier member connected to the first plier member between the first handle section and the first jaw section for rotational motion thereabout, the second plier having a second handle section and a second jaw section; and
    a tool module including a housing-partially enveloping and extending from the handle end of the first handle, portions of the tool module forming structure for mating, removable connection with the notch on the handle end, the tool module including a retractable fishing tool,
    wherein when the fishing tool is extended substantially beyond the hollow handle end, the tool may be used by the fisherman and then retracted when not in use.

11. The pliers of claim 10 wherein the retractable fishing tool is a fishing line threader.

12. The pliers of claim 10 wherein the retractable fishing tool is a hook hone.

* * * * *